Figure 1:
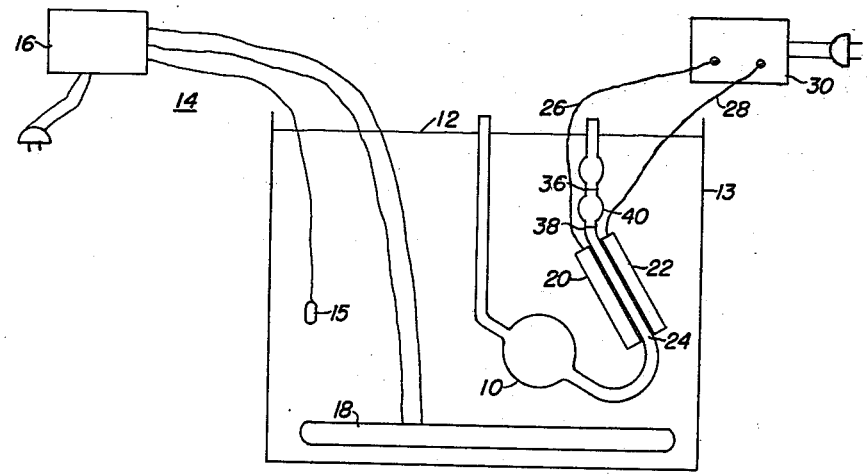

Oct. 1, 1963

L. E. ELLISON ETAL 3,105,379

APPARATUS FOR MEASURING THE APPARENT BULK MODULUS OF A
TRANSIENT-ELECTRIC-POTENTIAL-RESPONSIVE FLUID

Filed Aug. 22, 1961

2 Sheets-Sheet 1

INVENTORS
LYNN E. ELLISON
BY SIGIFREDO E. NUBER

ATTORNEY

Oct. 1, 1963 L. E. ELLISON ETAL 3,105,379
APPARATUS FOR MEASURING THE APPARENT BULK MODULUS OF A
TRANSIENT-ELECTRIC-POTENTIAL-RESPONSIVE FLUID
Filed Aug. 22, 1961 2 Sheets-Sheet 2

INVENTORS
LYNN E. ELLISON
BY SIGIFREDO E. NUBER

ATTORNEY

United States Patent Office 3,105,379
Patented Oct. 1, 1963

3,105,379
APPARATUS FOR MEASURING THE APPARENT BULK MODULUS OF A TRANSIENT-ELECTRIC-POTENTIAL-RESPONSIVE FLUID
Lynn E. Ellison, Crystal Lake, and Sigifredo E. Nuber, South Beloit, Ill.; said Ellison assignor, by direct and mesne assignments, to The Pure Oil Company, Chicago, Ill., a corporation of Ohio; said Nuber assignor to Warner Electric Brake & Clutch Company, South Beloit, Ill., a corporation of Delaware
Filed Aug. 22, 1961, Ser. No. 133,111
6 Claims. (Cl. 73—55)

This invention relates to means for varying the effective bulk modulus of transient-electric-potential-sensitive fluids, and more particularly to a device for evaluating the magnitude of response of transient-electric-potential-sensitive fluids to an applied alternating potential.

It is well known that certain fluids, commonly designated electro-fluids, respond to the application of an electric potential, either alternating or direct, or both, by displaying an instantaneous and often dramatic change in bulk modulus. Patent 2,661,596, to Willis M. Winslow, discloses compositions of electro-fluids which respond to both alternating and direct electric potentials, when the potentials are applied to electrodes disposed in contact with the electro-fluid.

It has now been found that transient-electric-potential-responsive fluids contained in receptacles fabricated of materials of high resistivity, exhibit change in bulk modulus when exposed to a transient electric potential applied by means of electrodes disposed externally with respect to the receptacle. Thus the electrodes need not contact the electro-fluid. Accordingly, it becomes possible to control the apparent bulk modulus of transient-electro-potential-responsive fluids contained in a receptacle of high resistivity, such as a glass beaker or tube, by means of electric potentials applied externally of the beaker or tube. By a transient electric potential is meant a potential of changing magnitude, i.e., voltage. Thus, as the term is used in this specification, transient electric potentials include potentials of varying positive voltage, as well as alternating potentials. For reasons which will later be made apparent, it is preferred, however, to employ alternating potentials.

It becomes, therefore, an object of this invention to provide means for varying the apparent bulk modulus of a transient-electric-potential-responsive fluid disposed in liquid-retaining means of high resistivity.

Another object of this invention is to provide means for varying the apparent bulk modulus of transient-electric-potential-responsive fluids by means of an electric potential applied by electrodes separated from the fluid by a high-resistivity material.

Another object of this invention is to provide a simple and efficient valve means for regulating the flow of electric-potential-sensitive fluids.

Still another object of this invention is to provide an apparatus for evaluating the magnitude of response of various fluids to transient-electric-potentials.

Figure 2:
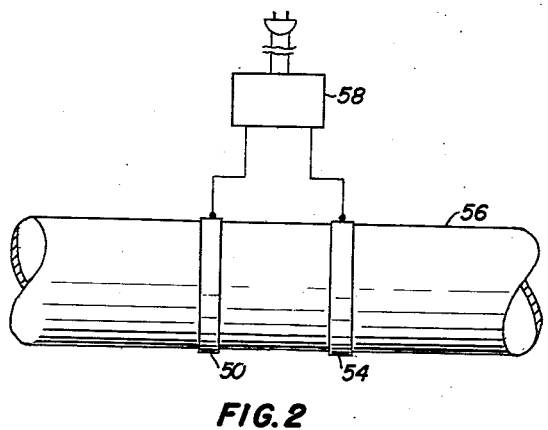
Figure 3:
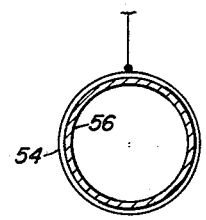
Figure 5:
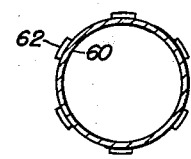
Figure 4:
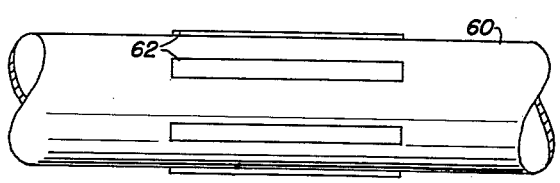
Figure 6:
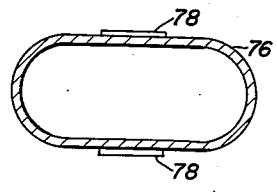

This invention is best described with reference to the drawings, of which:

FIGURE 1 is a frontal view of an apparatus for measuring the apparent bulk modulus of a fluid under the influence of an applied transient electric potential, FIGURE 2 is a frontal view of a valve for controlling the flow of transient-electric-potential-responsive fluids, FIGURE 3 is a side view of the assembly depicted in FIGURE 2, FIGURE 4 is a frontal view of an alternate valve means made in accordance with this invention, FIGURE 5 is a side view of the device depicted in FIGURE 4, and FIGURE 6 shows an end view of a valve fabricated in accordance with this invention.

Figure 7:
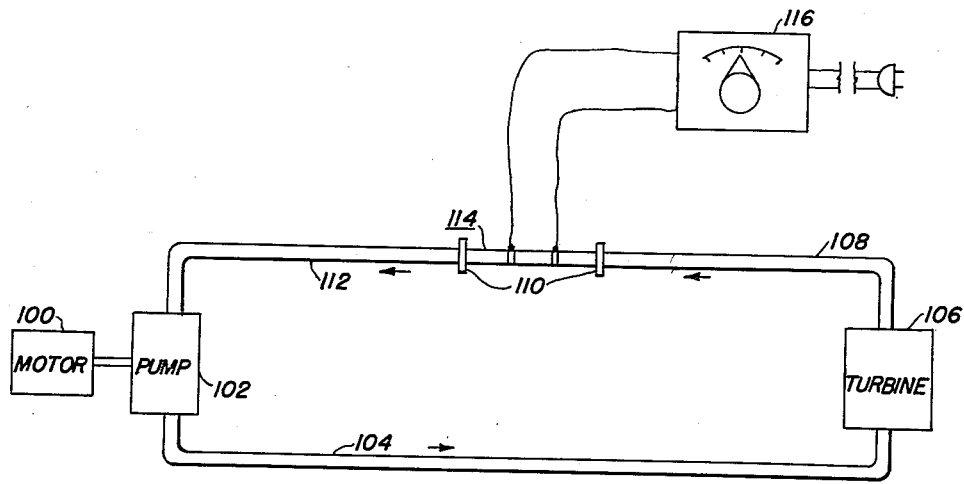

FIGURE 7 shows a hydraulic apparatus in which an improved valved means of this invention is employed.

Referring to FIGURE 1, viscometer 10, which is of the Cannon-Fenske type, is of integral construction and fabricated of ordinary laboratory glass. Viscometer 10 is immersed in oil bath 12 which is maintained within the beaker-like vessel 13. The temperature of the oil bath is maintained at a constant preselected value by means of thermo-regulator assembly 14, which comprises thermistor 15, temperature controller 16, and electric-resistance heater 18, with the associated electrical conductors as shown. Such thermo-regulator devices are well known and widely employed to maintain constant preselected temperatures. Electrodes 20 and 22, which are fabricated of a conducting metal, are positioned parallel to each other on opposite sides of thin-walled, capillary section 24 of viscometer 10, and are connected through lead wires 26 and 28 to a variable, alternating-potential source 30, which is preferably a Variac. The electric potential outlet from voltage source 30 may be of any convenient frequency, but preferably the frequency will be about 60 cycles per second or higher, because the precision of the resulting measurements obtained from the use of the equipment is directly proportional to the cyclic frequency of the applied potential. Two horizontal indicia, 36 and 38, are inscribed on the viscometer above and below volumetric bulb 40, such that the space enclosed within the viscometer between the inscribed indicia is of a predetermined volume. The time required for the surface of the test sample to fall from indicia 36 to indicia 38 is measured either by a stop-watch, or by an automatic timing mechanism, not shown. It will be understood that both ends of the viscometer 2 are open to the atmosphere and that the level of the test sample in the viscometer falls by force of gravity.

In preparing the apparatus of FIGURE 1 for determining the apparent bulk modulus of a transient-electric-potential-responsive fluid, a sample of the fluid to be tested is charged into the viscometer in conventional fashion, the viscometer and potential-applying electrodes are positioned in the oil bath, and the entire system is permitted to come to equilibrium temperature. Then a preselected alternating potential is applied between the plates, and the viscosity (or apparent bulk modulus) of the fluid is determined by noting the time required for the fluid level to fall from index line 36 to inscribed index 38, as is standard for viscometer determinations.

Having determined the apparent bulk modulus of the fluid at one potential, the potential is adjusted to a new value by adjustment of potential source 30, the sequence being repeated as many times as necessary to permit preparation of a curve establishing the relationship of apparent bulk modulus to applied potential, for the selected fluid. Ordinarily, it will be desirable to make one run with no applied potential, to determine the residual bulk modulus of the fluid. The determinations may be made in any order, beginning either with a high potential, or a low potential, or no potential, since the phenomenon by which the bulk modulus of the fluid varies is reversible, and an electric-potential-responsive fluid immediately everts to its residual bulk modulus value when removed from the influence of the applied potential.

The applied potential must be a transient electric-potential, as distinguished from a direct electric potential of constant value. The transient electric-potential may be a standard alternating potential as represented by the usual sine curve, but also may be an electric potential of varying magnitude following a curve pattern other than a sine wave, such as a saw-tooth or a square wave. While the viscometer apparatus has been described as integral and fabricated of glass, it will be evident that other forms of construction may be used. The portion of the viscometer between the indicia 36 and 38 should be fabricated of a transparent material. The viscometer capillary 24 between electrodes 20 and 22 should be fabricated of a high-resistivity material. Most metals are unsatisfactory for the purpose, but glass, ceramics, and plastics of high resistivity are suitable. Examples of suitable materials are porcelain and polyethylene. The thickness of the capillary wall is not critical, but it is preferred not to exceed 0.10 inch thickness at the zone between the electrodes.

Referring to FIGURES 2 and 3, a valve for controlling the flow of a transient-potential-responsive fluid is shown. Ring-like electrodes 50, and 54 are disposed annularly around cylindrical, thin wall tube 56. The two electrodes are connected to the output of variable potential source 58. The electrodes may be fabricated of any conductive material, but preferably are made as monolayer coils of conductive wire wound around the tube 56, or as ribbon-like strips of metal foil secured to the tube 56 by means of an adhesive. Since the electrodes are in contact only with the high-resistivity wall of tube 56, which wall is preferably thin and fabricated of a high-resistivity material, it will be evident that the power requirements of the valve are infinitesimally small. Effective control of the fluid flowing within the tube requires, however, the application of relatively high voltages, and potential source 58 is preferably one which is capable of applying output voltages in the range of 100 to 10,000 volts. The dimensions and spacings of the electrodes are not critical, but satisfactory results are obtained employing electrodes having a width of about a quarter-inch with a spacing of about a quarter-inch between electrodes. The thickness of the tube wall is not critical, but thick-walled tubes require application of excessively high voltages. Tube diameter is not critical, but best control is achieved when the diameter does not exceed about 0.25 inch.

Referring to FIGURES 4 and 5, a valve for controlling the flow of transient-electric-potential-responsive fluids is shown to comprise a plurality of electrodes disposed axially with respect to tube 60. The electrodes 62 are all of the same size and shape, and are disposed at equal angles around the tube periphery. Any number of electrodes greater than one may be employed, alternate electrodes being connected in parallel, to form two sets of electrodes which can be connected to an alternating potential source. FIGURE 6 shows a flat tube 76 with two electrodes 78 and 80 disposed on opposite sides of the tube.

The operation of the described valves is very simple. A transient-electric-potential-responsive fluid is assumed to flow through the tube section, such as section 56 of FIGURE 2. The apparent bulk modulus of the fluid within the zone defined by the electrodes varies in response to the magnitude of the applied potential. The size of the effective zone of control will depend upon the dimensions of the electrodes employed. The degree of control exerted over the fluid will depend upon the magnitude of response of the fluid to the applied potential, and this is determined by the fluid composition. The bulk modulus of the fluid within the effective zone of control of the electrodes will further depend upon the frequency of the applied potential. The apparent bulk modulus of the flowing fluid at no or low applied potential will be the residual viscosity of the fluid, which may, for example, be five centipoises. Upon the application of intense electric potentials, the apparent bulk modulus of the fluid will increase to values of as high as a thousand centipoises.

Referring to FIGURE 7, the valve assembly as depicted in FIGURE 2 is shown to be connected in a fluid flowline. Motor 100 drives pump 102, which circulates fluid through conduit 104 to turbine 106. The fluid exhausts from the turbine through conduit 108, which is connected by means of couplings 110 to conduit 112, which returns to the pump 102. A transient-electric-potential-responsive fluid is circulated through the system to drive turbine 106. It is evident that the power output of the turbine can effectively be controlled by throttling the flow of fluid through the system. This control is achieved by means of a valve assembly 114. Variac 116 is adjusted to the desired output potential, to regulate the extent of throttling of fluid flow, and thereby control the output of turbine 106. This device is merely illustrative of the numerous applications of the novel valve means of this invention in hydraulic apparatus.

As a specific example of the use of the valve means of this invention, a motor, pump, turbine, and valve assembly is constructed as shown in FIGURE 7. The valve means is identical with that shown and described in detail with respect to FIGURE 2. The circulating fluid is a transient-electric-potential-responsive liquid formulated as follows:

| | Grams |
|---|---|
| Refined white oil | 36 |
| Silica | 51 |
| Glycerol monooleate | 4.1 |
| Ethylene glycol | 3.1 |
| 1-hydroxy ethyl 2-heptadecyl imidazolene | 10.1 |
| N-aminoethyl ethanolamine | 1.1 |
| Barium titanate | 17.7 |

With Variac 116 shut off, motor 100 is started and brought to its rated r.p.m. The output speed of turbine 106 is found to be 1,000 revolutions per minute. Variac 116 is now turned on and adjusted for a value of 6,000 volts. The speed of turbine 106 is found to be reduced to 300 r.p.m.

While the use of the device of this invention has been specifically illustrated in relation to a transient-electric-potential-responsive fluid of specific composition, it will be evident that any transient-potential-responsive fluid may be employed. The compositions of such fluids form no part of the instant invention. Transient-potential-responsive fluids of various compositions are well known in the art.

The embodiments of the invention in which an exclusive property or privilege is claimed are defined as follows:

1. Fluid flow control means comprising a relatively thin-walled conduit fabricated of a high-resistivity material, a transient-electric-potential-responsive fluid within said conduit, a pair of electrodes disposed adjacent to said conduit externally thereof, and means for applying a transient electric potential to said electrodes.

2. An apparatus in accordance with claim 1 in which said electrodes are elongated strips disposed in parallel relationship with the axis of said conduit, said strips being spaced from each other around said conduit.

3. An apparatus in accordance with claim 2 in which said electrodes are foil-like metallic strips.

4. An apparatus for measuring the apparent bulk modulus of a transient-electric-potential-responsive fluid comprising a receptacle for a constant-temperature bath, thermo-regulator means for maintaining a constant temperature in said receptacle, viscometer means including upper and lower vessels supported within said receptacle, a relatively thin-walled conduit fabricated of high-resistivity material connecting said vessels, a pair of electrodes disposed adjacent to said conduit externally thereof, means for applying a transient electric potential to said electrodes, and liquid-level indicia associated with one said vessel.

5. An apparatus in accordance with claim 4 in which said electrodes are elongated strips disposed in parallel relationship with the axis of said conduit, said strips being spaced from each other around said conduit.

6. An apparatus in accordance with claim 5 in which said electrodes are foil-like metallic strips.

References Cited in the file of this patent

UNITED STATES PATENTS

| | | |
|---|---|---|
| 2,067,430 | Zeitfuchs | Jan. 12, 1937 |
| 2,661,596 | Winslow | Dec. 8, 1953 |
| 2,743,898 | King | May 1, 1956 |